INVENTORS.
HARRY DAVIS
SIDNEY ROSENBERG
BY
ATTORNEYS

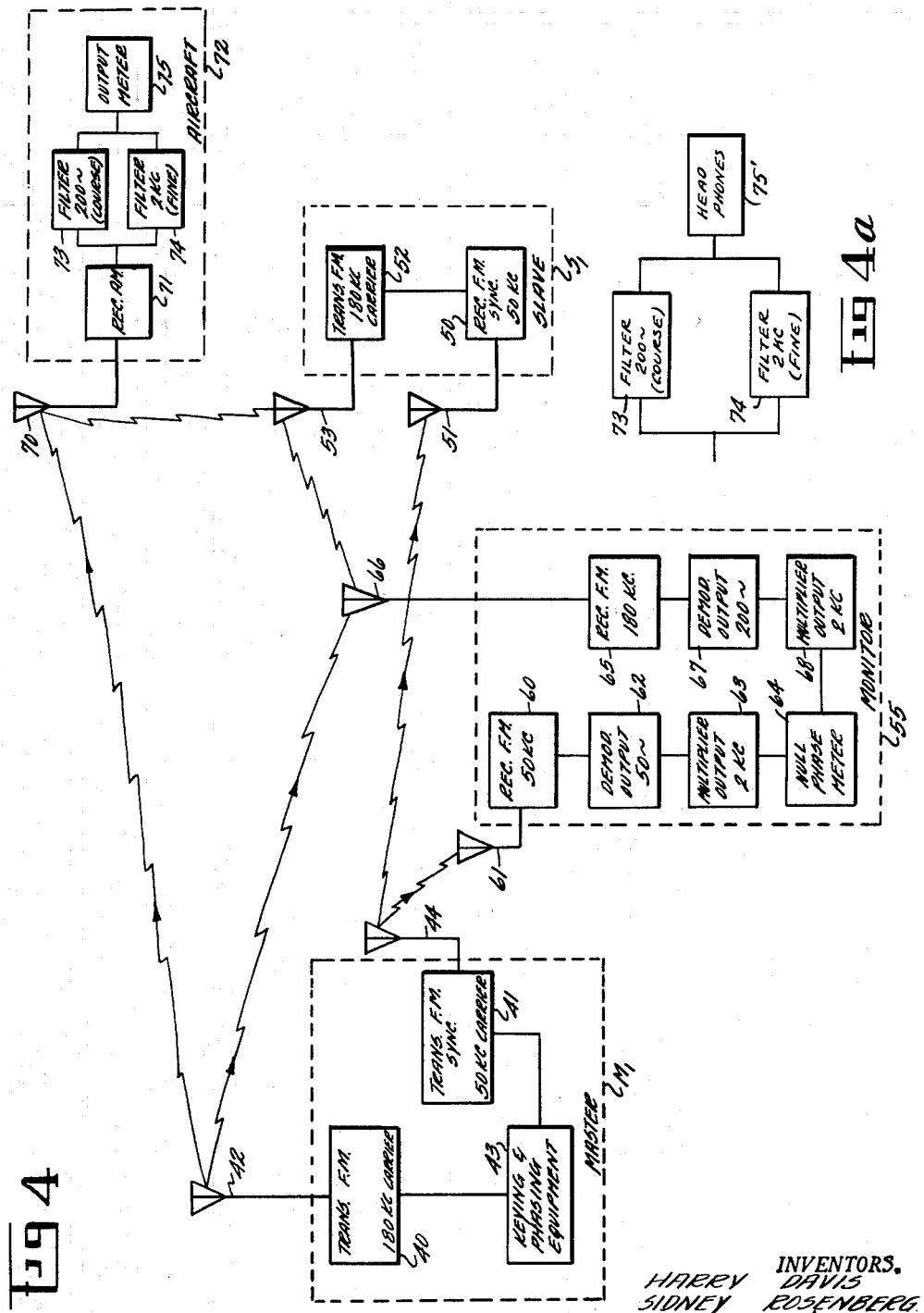

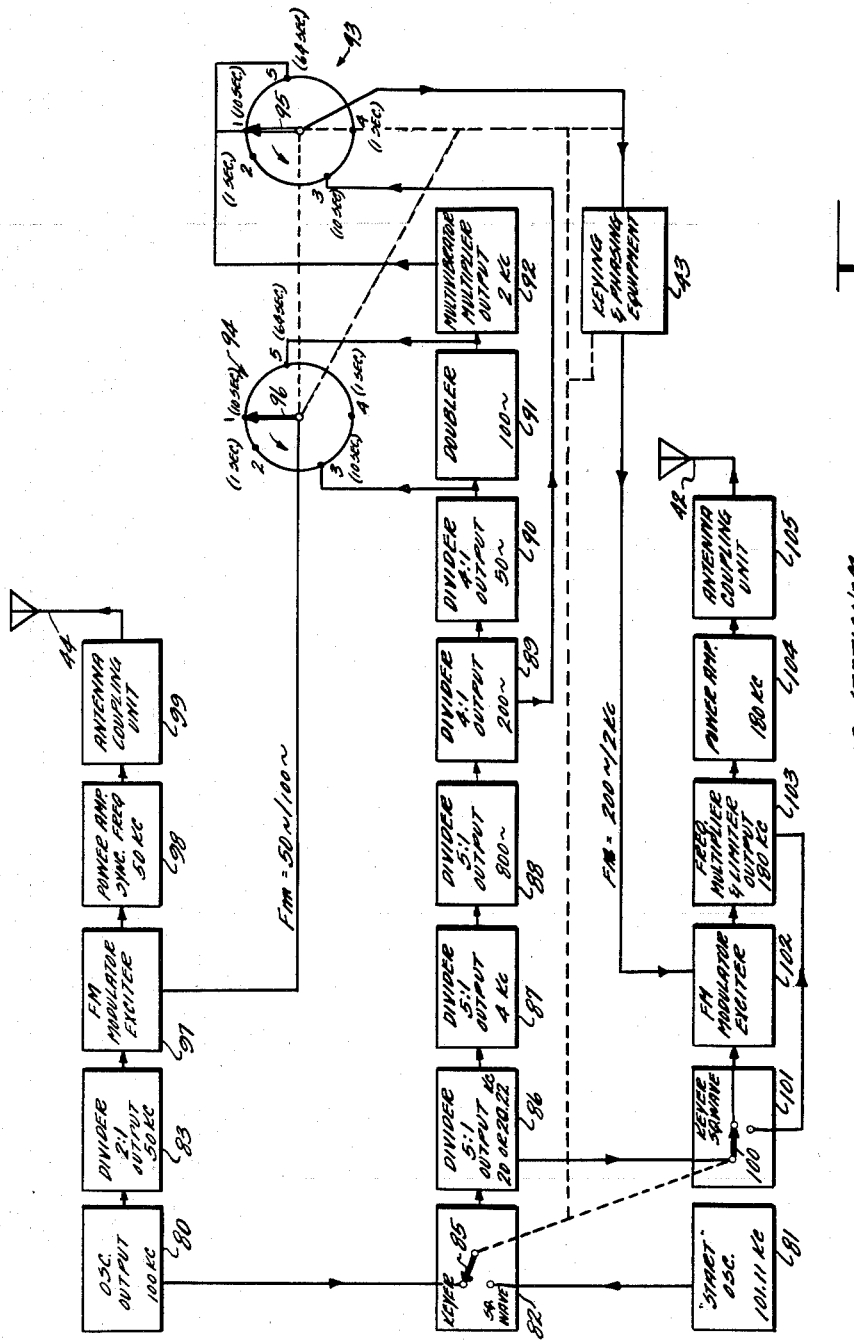

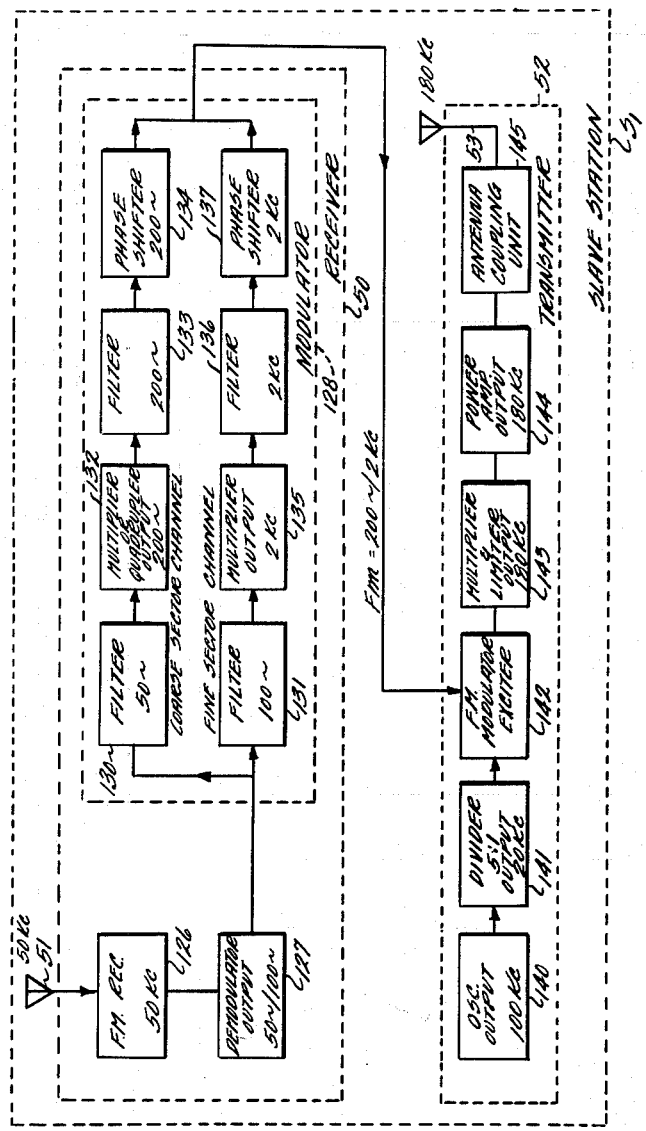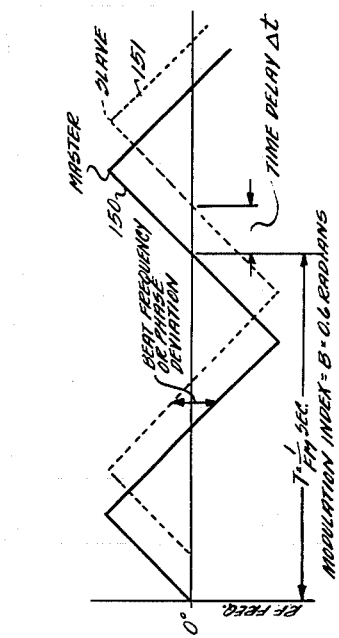

Fig. 8. — TIME SCHEDULE OF THE TRANSMITTED MASTER OPERATIONAL AND SYNCHRONIZING OUTPUTS

| STEPS | TIME SECONDS | TYPE OF EMISSION OPERATIONAL | TYPE OF EMISSION SYNCHRONIZER | TYPICAL WAVEFORMS OPERATIONAL | TYPICAL WAVEFORMS SYNCHRONIZER | OPERATION | TIME DURATION SECONDS |
|---|---|---|---|---|---|---|---|
| 1 | 0-10 | KEYED 180 KC FM, 2 KC MOD. | OFF | DOT DASH DASH DOT | | IDENTIFICATION | 10 |
| 2 | 10-11 | KEYED (182 KC) CW | OFF | DASH DOT | | START OF "COARSE" | 1 |
| 3 | 11-21 | PHASE SHIFTED (1 REVOLUTION/8 SECONDS) 180 KC FM 200 CPS MOD. | 50 KC FM, 50 CPS MOD. | | | "COARSE" | 10 |
| 4 | 21-22 | KEYED (182 KC) CW | OFF | DASH DOT | | START OF "FINE" | 1 |
| 5 | 22-86 | PHASE SHIFTED (1 REVOLUTION/MINUTE) 180 KC FM 2 KC MOD. | 50 KC FM, 100 CPS MOD. | | | "FINE" | 64 |
| 6 | | REPEAT STEPS 1 THROUGH 5 ABOVE | | | | | |

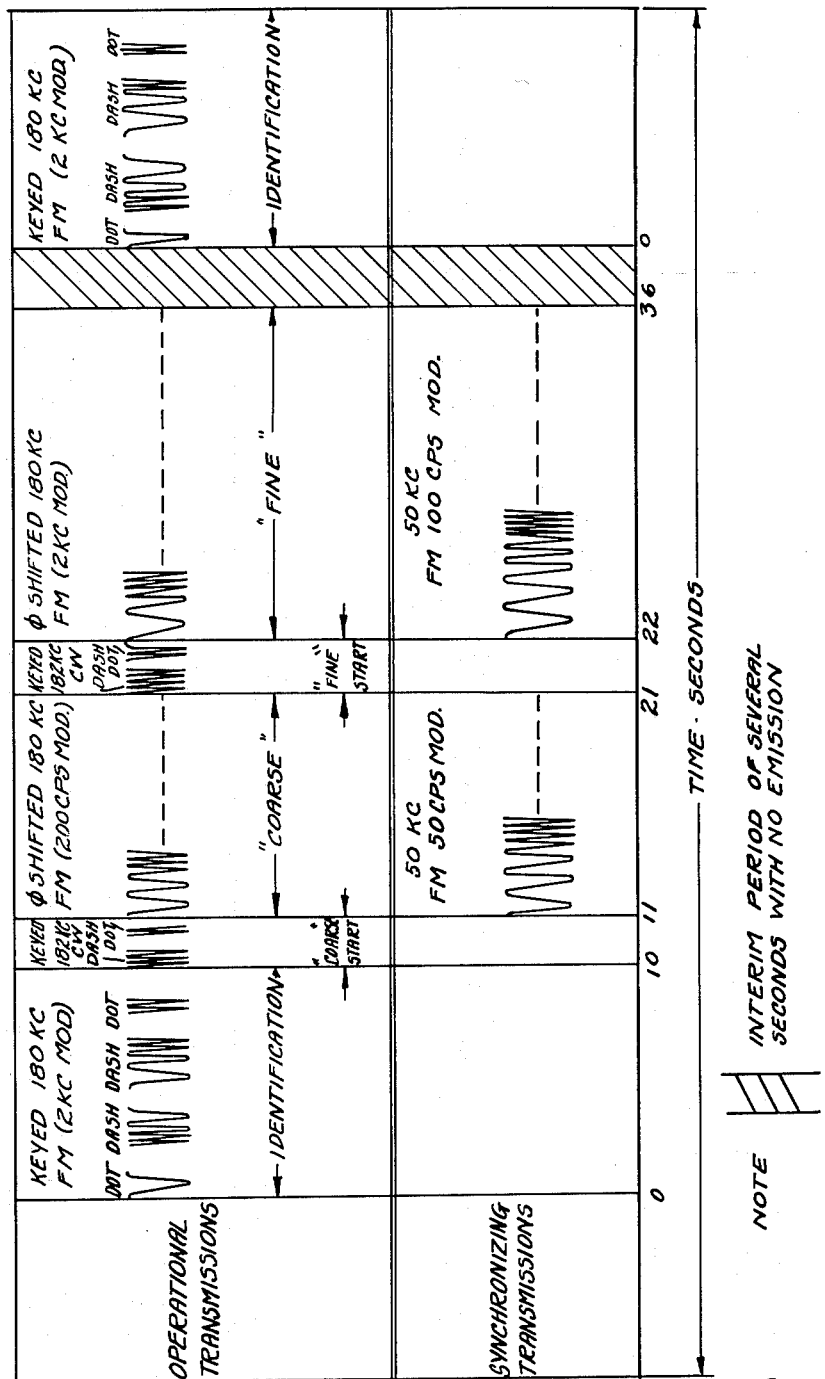

United States Patent Office 2,754,512
Patented July 10, 1956

2,754,512

FM LONG RANGE NAVIGATION SYSTEM

Harry Davis, Long Branch, and Sidney Rosenberg, Red Bank, N. J.

Application June 26, 1951, Serial No. 233,674

3 Claims. (Cl. 343—104)

(Granted under Title 35, U. S. Code (1952), sec. 266)

The invention described herein may be manufactured and used by or for the Government for governmental purposes without payment to us of any royalty thereon.

The present invention is in the field of radio navigation systems for use by aircraft, ships and the like, and more particularly to such a system by means of which the pilot of an aircraft carrying a common type of radio receiver may, in approximately one minute, determine his geographical position from the interception of signal transmitted from one double master and two slave stations at known locations on the ground. The term double master station is used in the sense that two master signals originate at a single geographical position.

The signal intercepted by the aircraft and used in determining its geographical location, is transmitted from the ground stations that are known to be at fixed geographical locations. Two partially overlapping systems of hyperbolic coordinates are maintained between the ground stations. The ground stations comprise a double master station and two slave stations that are spaced geographically from each other and from the double master station. The double master station maintains one family of confocal hyperbolas with one of the slave stations and a second family of confocal hyperbolas with the second slave station. The two families of hyperbolas partially overlap each other. Signal between the first pair of master and slave stations distinguishes from signal between the second pair of master and slave stations by differences in distinctive carrier frequencies and by identifying code signals. At the aircraft one line of position is derived from signal received from one pair of master and slave stations and the other line of position is derived from signal received from the other pair of master and slave stations. The aircraft is at the intersection of the two lines of position. In construction and operation one pair of master and slave stations is substantially a duplicate of the other pair. One pair of master and slave stations is located at the foci of and establish in space one family of confocal hyperbolae therebetween.

The objects of the present invention include the provision of an improved long range distance measuring navigation system of the hyperbolic type that requires but four channels of different frequencies; that uses continuous wave signals that are economical of band width; that uses cyclic frequency modulation of a carrier to minimize fading, interference and other operational disturbances; that minimizes ambiguity of coordinate identifications; and wherein operations are simply and rapidly made with mobile equipment operated by a pilot-navigator and not requiring the services of a highly trained navigational specialist.

Another object of the invention is to provide a distance determining system based on time of propagation of radio signals but wherein time intervals are observable by a simple interval counter, such as a stop watch for example.

An operative embodiment of the present invention is shown in the accompanying drawings, wherein:

Fig. 4 is a block circuit diagram of one pair of master and slave stations shown in Fig. 1 with a monitor station therebetween and a block circuit diagram of the equipment within an aircraft using the present system in determining its geographical position or making a bearing;

Fig. 4a is a block circuit diagram of headphones replacing the output meter in the aircraft circuit of Fig. 4;

Fig. 5 is a block circuit diagram of the equipment within the master station shown in Fig. 4;

Fig. 6 is a block circuit diagram of the equipment within the slave station shown in Fig. 4;

Fig. 7 shows representative wave forms of two identical signal envelopes displaced in phase by a time difference $\Delta t$ and with a frequency difference $\Delta f$ or intermediate frequency wave at the mixer output in the aircraft receiver shown in Fig. 4;

Fig. 8 is a time schedule of the transmitted master operational and synchronizing outputs; and Fig. 9 is the wave form sequence of the transmitted operational and synchronizing outputs.

The above Figures 8 and 9 show the type and the time of each signal radiated from the two antennas at the master station transmitters and, in connection with the following description of the present invention, are believed to be amply clear.

Figure 1:
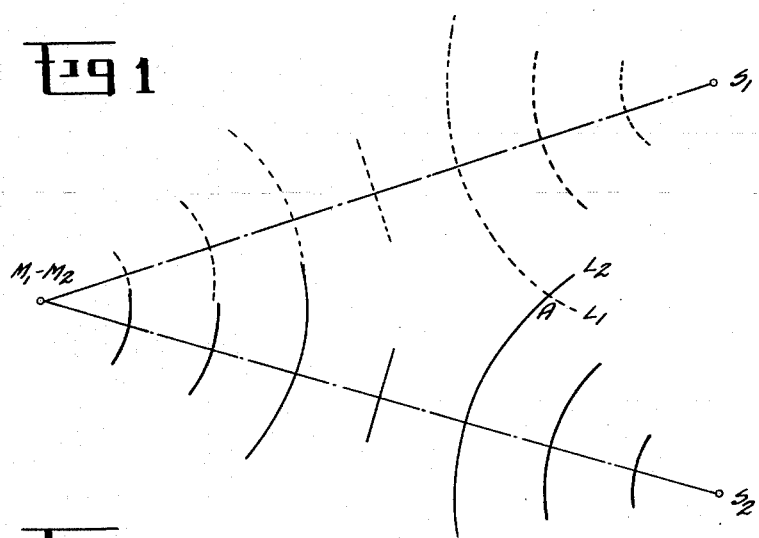
Fig. 1 is a representative ground station arrangement of one double master station and two slave stations with two partially overlapping systems of hyperbolic lines shown therebetween.

In Fig. 1 of the accompanying drawings, a double master station M1 M2, at one geographical location is spaced illustratively from 300 to 700 miles from two slave stations S1 and S2 that also are spaced from each other geographically. One family of confocal hyperbolas is shown in dashed lines with the master station M1 and the slave station S1 at the foci thereof. A second family of confocal hyperbolas is shown in full lines with the master station M2 and the slave station S2 at the foci thereof. The two families of hyperbolas overlap, as indicated by the two lines L1 and L2 intersecting at the point A, to provide a grid such that an aircraft pilot making a determination indicating that he is at point A will know his geographical location with a considerable degree of accuracy.

The system is a distance measuring system in that distance is measured by a time interval that is extended to a readily observable magnitude by varying the phase of a modulation applied to a carrier over a period of several seconds.

In making a determination of his geographical position the aircraft pilot tunes his receiver to the frequency of an operation signal transmitted from and common to one pair of master and slave stations. At the reception of a "start" signal the pilot starts his stop watch and at the first null signal thereafter stops his stop watch. The number of elapsed seconds on the stop watch is characteristic of the pilot's location with respect to that pair of master and slave stations. In a corresponding manner the pilot takes two readings in determining his proximity to the line L1, and then takes two readings in determining his proximity to line L2. Because of the similarity in structure, mode of operation and result, a description of the equipment and operations in making the two readings for the line L1 between the stations M1 and S1 may be taken as being representative of the equipment and operations in making the readings for both of the lines L1 and L2 in locating their intersection at the point A.

The two readings taken for the line L1 comprise first a coarse system reading and then a fine system reading. The coarse system reading indicates that the aircraft is within one of the hyperbolic coarse sectors C1, C2, C3, etc., represented in Fig. 2 of the drawings. The fine system reading indicates, within the coarse sector determined by the first reading, that the aircraft is within one of the hyperbolic fine lanes represented in Fig. 3 of the drawings or nearest to a particular fine system line L1.

It is characteristic of some cyclic systems of position finding by radio that if ambiguities in identification of grid coordinates is to be minimized the cyclic pattern of the grid must be large and as a consequence the precision must be small. If precision is to be obtained the pattern must be small. With simple patterns in the older cyclic systems there were many coordinates having the same identifying parameter with resulting ambiguity. This characteristic of the older cyclic systems is minimized in the present system by providing a coarse grid system and a fine grid system that are alternated in time. The precise position is established by the fine system and the ambiguity is resolved by the coarse system.

Figure 2:
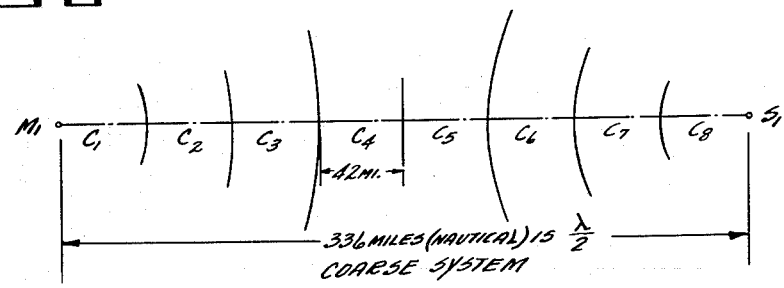
Fig. 2 is a representative system of hyperbolic lines from Fig. 1 subdivided into a plurality of coarse sectors.
Figure 3:
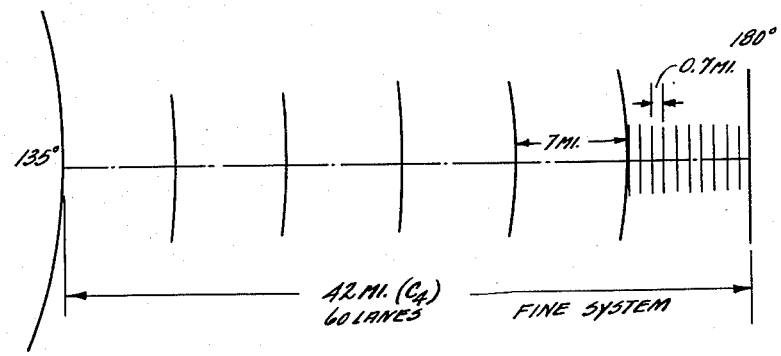
Fig. 3 is a representative coarse sector from Fig. 2 subdivided into a plurality of fine sectors or lanes.

In the present invention the coarse system shown in Fig. 2, illustratively divides the distance between the pairs of master and slave stations into eight coarse sectors. The fine system shown in Fig. 3, illustratively indicates the division of any one of the coarse sectors into 60 fine lanes.

For purposes of illustration of the present invention, if the master and slave stations are about 336 nautical miles apart, then at a line connecting the two stations a coarse sector is 42 nautical miles wide and a fine lane is 0.7 of one nautical mile wide. For conversion one nautical mile equals 1.15 statute miles.

One pair of master and slave stations M1 and S1 shown in Fig. 4 are duplicated substantially by the other pair of master and slave stations M2 and S2 and consequently a description of the structure and operation of one pair of stations will suffice for both. Each system of confocal hyperbolas is characterized by one group of components that operate to transmit signal through which an aircraft pilot may determine his bearings and hence these components are referred to as operational components whereas a second group of components that operate to maintain synchronization among the operational components are referred to as synchronizing components.

The master station M1 is provided with an operational transmitter 40 and a synchronizing transmitter 41 with keying and phasing equipment 43 connected therebetween. The equipment 43 shifts signal phase 360° and illustratively may be a capacitive goniometer with sequentially in series ahead of it in circuit, a phase inverter and then a phasing network bridge, as shown at page 493, Figs. 13–20, and 13–21, volume 19, Radiation Laboratory Series, published 1949, and passing the bridge output shifted in phase through 2 pi radians from its rotating capacitive plate to the grid of a cathode follower from the cathode of which it may be amplified to a desired degree of amplification. The operational transmitter 40 is provided with a transmission antenna 42 and the synchronizing transmitter 41 is provided with a transmission antenna 44. Every 2 minutes the master station transmits a signal keyed to indicate the identity of that particular master station.

The master station operational transmitter 40 transmits illustratively a 180 kc. continuous wave carrier bearing a 200 cycle audio modulation for the coarse system and also a 2000 cycle audio modulation for the fine system. The synchronizing transmitter 41 transmits illustratively a 50 kc. continuous wave carrier bearing a 50 cycle audio modulation for the coarse system and also a 100 cycle audio modulation for the fine system. The continuously changing phase of signal modulation transmitted from the operational transmitter 40 at the master station is under the control of the keying and phasing equipment 43. Every two minutes the master station emits a signal keyed to indicate the identity of that particular master station.

The slave station S1 is provided with a synchronizing receiver 50 with a receiving antenna 51 and connected with a transmitter 52 that has a transmitting antenna 53. The slave station synchronizing receiver 50 is tuned to receive the signal impressed upon the 50 kc. carrier transmitted from the master station synchronizing transmitter 41. The slave station operational transmitter 52 is tuned to transmit a slave operational signal substantially corresponding with the master operational signal transmitted from the master operational transmitter 40 but of constant phase.

A monitor station 55 is maintained preferably about midway between the master and slave stations M1 and S1. The monitor station 55 serves to maintain synchronization in the signal phase relation between the master and the slave stations between which it is positioned. The monitor station 55 is provided with a frequency modulated receiver 60 that is tuned for the reception through its antenna 61 of a system synchronizing envelope on the 50 kilocycle carrier from the master station synchronizing transmitter 41. The signal so received is passed to a demodulator 62 where it is reduced to a 50 cycle output. The 50 cycle output from the demodulator 62 is passed to a multiplier 63 where it is increased to a two kilocycle output that is passed to a null phase meter 64.

The monitor station 55 also is provided with a frequency modulated receiver 65 with its antenna 66. The monitor station receiver 65 is tuned to receive signal on 180 kilocycle carriers and hence receives the variable phase signal from both the master station transmitter 40 and the constant phase signal from the slave station transmitter 52. Output from the monitor station receiver 65 is passed to a demodulator 67 having a 200 cycle output that is passed to a multiplier 68 where the 200 cycle received signal is increased to a 2 kilocycle frequency output that is applied to the null phase meter 64. The meter 64 compares the modulation on the 180 kilocycle carriers transmitted from the master station M1 and from the slave station S1 with the modulation on the 50 kilocycle carrier transmitted from the master station M1.

An operator at the monitor station 55 continuously observes the periodic nulls in the phase meter 64 that by their times of occurrence may indicate departures from synchronization between the signals transmitted on 180 kilocycle carriers from the master station M1 and from the slave station S1. In the event that signal from the master and slave stations M1 and S1 should depart from synchronization, a direct communication or wire line, not shown, between the master station M1 and the monitor station 55 is available to the operator at the monitor station 55 so that he may so inform an operator at the master station M1 who thereupon returns the signals to synchronization.

The continuously phase shifted operational signal of 200 cycle coarse and 2 kc. fine modulation on the 180 kilocycle carrier from the master station transmitter 40 and the unphase shifted signal of 200 cycle coarse and 2 kc. fine modulation on the 180 kilocycle carrier transmitted from the slave station transmitter 52 are available in succession for interception by an airbourne receiving antenna 70 of a radio receiver 71 carried by the aircraft 72 that is to use the navigation system presented hereby for determining its position. Interception in the aircraft is accomplished by the careful tuning of the radio receiver 71, that contains as components a usual combination of detector, oscillator, mixer and the like, not shown. Output from the receiver 71 preferably is passed to a suitable audio band-pass filter for the minimizing of objectionable harmonics. The receiver 71 is tuned simultaneously to the 180 kilocycle carriers from both the master station transmitter 40 and from the slave station transmitter 52. The 50 k. c. carrier from the master station transmitter 41 will not be received by the aircraft receiver 71 tuned to receive 180 kilocycle signal.

The 180 kilocycle operational signal so intercepted by the airbourne radio receiver 71 is demodulated and is fed to two channels indicated by the two filters 73 and 74. The filter 73 is tuned to pass signal of 200 cycles per second and hence passes signal during the making of determinations of the coarse system. The filter 74 is tuned to pass signal of 2000 cycles per second and passes signal during the making of determinations of the fine system. The filter output from the two filters 73 and 74 is presented to an output meter 75 upon which signals are indicated for use in the making of readings as herein set forth.

A more detailed block diagram of the circuit at the master station M1 is shown in Fig. 5 of the accompanying drawings. In the circuit there shown, a frequency originates selectively from one of a pair of crystal controlled oscillators 80 or 81 through a switch or keyer 82. The oscillator 80 supplies its basic frequency of 100 kilocycles for all synchronizing operations of the circuit shown in Fig. 5 by being passed directly to a divider 83 where it is reduced to a 50 kilocycle output fed to a modulator exciter 97 where a modulation envelope is applied to this carrier frequency. The 100 kilocycle frequency of the oscillator 80 also is supplied to a contact engaged by a switch arm 85 in the keyer 82 as shown.

The oscillator 81 supplies a frequency of 101.11 kilocycles to a contact engaged by the switch arm 85 in the keyer 82 and is used to generate an unmodulated 182 kilocycle output frequency. The keyer arm 85 is ganged to be moved with another keyer arm 100 in another keyer 101. With the key arm 85 on the contact connected with the oscillator 80, the 100 kilocycle frequency is passed to a 5 to 1 divider 86 where the 100 kilocycle input frequency is reduced to an output frequency of 20 kilocycles. With the key arm 85 on the contact from the oscillator 81, the 101.11 kilocycle frequency of the oscillator 81 is reduced by the divider 86 to an output frequency of 20.22 kilocycles. The 20 kilocycle frequency is used to generate the 180 kilocycle frequency carrier output from the master station M1. The 20.22 kilocycle frequency provides a "start" signal for the master station M1 by being multiplied by 9 at the frequency multiplier and limiter 103 to provide a 182 kilocycle carrier. The "start" crystal oscillator 81 in Fig. 5 provides the frequency used for both the coding signal identifying the station and for the "start" signal for both the coarse and the fine systems at an unmodulated 182 kilocycle "start" signal frequency. The 182 kilocycle output from the frequency multiplier and limiter 103 is amplified in the amplifier 104 and is passed to the antenna coupling unit 105 for transmission from the antenna 42.

Within the aircraft receiver 71 in Fig. 4 the 182 kilocycle "start" signal frequency from the master station transmitter 40 is beat against the 180 kilocycle frequency from the slave station transmitter 52 to produce a two kilocycle beat note. The two kilocycle beat note so produced is audible in the output of the aircraft receiver 71 when the receiver is tuned to 180 kilocycles and head phones 75′ are used. The head phones 75′ are connected across or replace the meter 75. The two kilocycle beat note so produced serves as the "start" signal for both the coarse system determinations and the fine system determinations made in the practice of the present invention.

The master station keyer 101 preferably is a single pole double throw relay adapted for selecting from the divider 86 either its 20 kilocycle output or its 20.22 kilocycle output to drive either the modulator exciter 102 or the frequency multiplier and limiter 103. The switch 85 in the keyer 82 is so ganged with the switch 100 in the keyer 101, that when the switch 85 engages the contact connected with the "start" oscillator 81 the switch 100 engages the contact to the frequency multiplier and limiter 103 and the "start" signal by-passes the modulator exciter 102. The switches 85 and 100 also are ganged with the keying and phasing equipment 43 and with operational timing cam arms 95 and 96, as indicated by the dash line extending thereamong. When the switch arm 85 engages the contact connected with the oscillator 80 the switch arm 100 engages the contact connected with the modulator exciter 102.

In Fig. 5 one output from the divider 86 is passed successively through additional dividers 87, 88, 89 and 90 that have successive outputs at the respective frequencies shown. The 50 cycle output from the divider 90 is increased to 100 cycles in a doubler 91. The 100 cycle ouput from the doubler 91 is passed to a multivibrator multiplier 92 having an output of two kilocycles.

The master station M1 is provided with an operational timing cam 93 and with a synchronizing timing cam 94. The operational timing cam 93 has five contacts. The 2 kilocycle output from the multivibrator multiplier is supplied to the first and fifth contacts of the operational timing cam 93. The 200 cycle output from the divider 89 is applied to the third contact of the operational timing cam 93. The contacts of the operational timing cam 93 are swept by the counterclockwise rotation of the cam sweep arm 95.

The sweep arm 95 of the operational timing cam 93 is connected with the keying and phasing equipment 43. When the operational timing cam arm 95 is in engagement with the first or with the fifth of its cam contacts the two kilocycle output from the multivibrator multiplier 92 is passed to the keying and phasing equipment 43. When the operational cam arm 95 in Figure 5 is in engagement with its third cam contact, the 200 cycle output from the divider 89 is passed through the cam arm 95 to the keying and phasing equipment 43. Output from the keying and phasing equipment 43 is passed to a modulator exciter 102 as a 200 cycle coarse system modulation or a 2 kilocycle fine system modulation and is impressed as frequency modulation on a 180 kilocycle carrier to be transmitted from the operational antenna 42.

With respect to the phase of modulating frequencies from the operational timing cam 93 that are passed to the modulator exciter 102, the 200 cycle per second coarse system modulation or the 2000 cycle per second or 2 kilocycle fine system modulation are applied successively as modulation to the 20 kilocycle carrier from the divider 86 at a continuously changing phase angle controlled by the operation of the keying and phasing equipment 43. The keying and phasing equipment 43 cyclically and progressively shifts the phase of the frequencies that are applied to it through $2\pi$ radians. For the coarse modulation the period of the cycle illustratively is 8 seconds, for the fine modulation it is 60 seconds. The resultant continuously phase modulated output from the modulator exciter 102 is passed successively to the frequency multiplier and limiter 103, where the 20 kilocycle carrier is multiplied to a 180 kilocycle frequency, then to the power amplifier 104 and to the antenna coupling unit 105 for transmission from the antenna 42. Operational signal transmitted from the antenna 42 is either a 200 cycle coarse system envelope on a 180 kilocycle carrier, or a 2 kilocycle fine system envelope on a 180 kilocycle carrier, that is continuously phase shifted as transmitted from the antenna 42 at the master station M1.

The synchronizing timing cam 94 also is provided with 5 contacts successively swept by the counterclockwise rotation of the cam sweep arm 96. The 50 cycle output from the divider 90 is passed to the third contact on the synchronizing timing cam 94. The 100 cycle output from the doubler 91 is passed to the fifth contact on the timing cam 94. The cam sweep arms 95 and 96 are ganged to be moved together.

The cam sweep arm 96 of the synchronizing timing cam 94 is connected to the frequency modulator exciter 97. The 50 kilocycle output from the divider 83 has the 50 cycle output from the divider 90 impressed thereupon at the modulator exciter 97 when the cam sweep arm 96 engages the third contact on the synchronizing timing cam 94. The 50 kilocycle carrier from the divider 83, with the 50 cycle synchronizing modulation from the divider 90 impressed thereupon during the time the arm 96 of the cam 94 is on its third contact, is then amplified by the amplifier 98 and is passed through an antenna coupling unit 99 for transmission from the antenna 44. During the time the synchronizing cam sweep arm 96 is in engagement with the fifth contact on the synchronizing timing cam 94, the 100 cycle modulation from the doubler 91 is impressed upon the 50 kilocycle carrier from the divider 83 at the modulator exciter 97. The resultant 100 cycle modulation on the 50 kilocycle carrier is then amplified in the power amplifier 98 and is passed through the antenna coupling unit 99 to be transmitted from the antenna 44.

As indicated in Fig. 5, illustratively during 1 cycle, the operational timing cam arms 95 and 96 engage their first contact for 10 seconds and then their second contact for one second. Both cam arms 95 and 96 remain in engagement with their third contacts for 10 seconds, with their fourth contacts for 1 second and then with their fifth contacts for 64 seconds. During the transmission of the coarse modulation the cam arms 95 and 96 are on their third contacts and during the 64 seconds transmission of the fine modulation the cam arms 95 and 96 are on their fifth contacts.

The circuit block diagram of the slave station S1, that maintains a family of hyperbolic lines with the master station M1, is shown in Fig. 6 of the accompanying drawings. Synchronization between the master station M1 and the slave station S1, is maintained by the synchronization modulation envelope on the 50 kilocycle carrier that is transmitted from the master station transmitter antenna 44 in Figs. 4 and 5, and is intercepted by the slave station antenna 51 and receiver 50 in Figs. 4 and 6. The 50 kilocycle carrier so received bears a 50 cycle synchronization modulation envelope for coarse system determinations or a 100 cycle synchronization modulation envelope for fine system determinations, as indicated in Figs. 4, 5 and 6.

In Fig. 6 the intercepted synchronization signal is passed from the receiver 126 to a demodulator 127. The demodulator 127 has an output the 50 cycle or the 100 cycle synchronization modulation brought by the 50 kilocycle carrier from the master station M1. Output from the demodulator 127 is passed to a modulator 128 where it is applied to two filters 130 and 131 tuned respectively to 50 cycles and 100 cycles and opening into their respective coarse sector channel and fine lane channel as indicated in Fig. 6 of the drawings.

The 50 cycle coarse system synchronization signal so admitted by the coarse system filter 130 into the coarse sector channel is quadrupled in frequency in the multiplier 132 to 200 cycles and then is refiltered at the 200 cycle frequency by a second coarse sector channel filter 133. The 200 cycle output from the second coarse sector channel filter 133 is then passed to a phase shifter 134 from which it is passed to a modulation exciter 142 in the slave station transmitter 52 in Fig. 6.

The 100 cycle fine system synchronizing signal admitted by the fine lane channel filter 131 is increased to two kilocycles by a multiplier 135. The two kilocycle output from the multiplier 135 is passed to a second fine lane channel filter 136 from which it is applied to a phase shifter 137. The output from the phase shifter 137 is applied to the modulator exciter 142 in the slave station transmitter 52.

The slave station transmitter 52 derives its basic frequency of 100 kilocycles from an oscillator 140. The 100 kilocycle output from the oscillator 140 is reduced to 20 kilocycles by a divider 141. The divider 141 applies its 20 kilocycle output to the FM modulator exciter 142 to which the slave station receiver modulator 128 also passes its 200 cycle coarse system and 2000 cycle fine system outputs to be applied successively as modulation envelopes upon the 20 kilocycles carrier from the divider 141.

The output from the transmitter modulator exciter 142 bearing the slave station operational modulation from the receiver 50 is multiplied to a 180 kilocycle frequency by a multiplier and limiter 143 and then is amplified in a power amplifier 144 and passed through an antenna coupling unit 145 for radiation from a transmitting antenna 53. The operational signal so transmitted from the slave station S1 is either a 200 cycle coarse system modulation envelope or a two kilocycle fine system modulation envelope on the 180 kilocycle carrier transmitted from the slave station transmitter 52. The 200 cycle coarse system envelope and the 2000 cycle fine system envelope operational signals are transmitted from the slave station S1 at a constant phase. The operational signal envelopes of corresponding frequencies transmitted from the master station M1 are at continuously displaced phase as compared with the constant phase of the corresponding operational signal envelope transmitted from the slave station S1.

In the keying and timing operations of the master station circuit shown in Figs. 4 and 5, the cam arms 95 and 96 on their first positions or timing cams, acting through a choice of suitable equipment, such as microswitches, relays and the like, contemplated in the block diagram as usual equipment for the purpose and consequently not shown in detail, close upwardly the keyer switches 85 and 100 to their contacts connected with the oscillator 80 and with the modulator exciter 102 respectively.

At the same instant a code keying switch, not shown, as normally a part of the keying and phasing equipment 43 is driven to key particular identification characters for an illustrative period of 10 seconds. This permits the operational signal radiating master station 180 kilocycle transmitter 40 to be frequency modulated with the two kilocycle tone from the multivibrator multiplier 92 during this first identification period of 10 seconds and permits the pilot in the aircraft 72 to identify the master station M1 from which he is intercepting signal.

With the cam arm 96 on its first contact no modulation is applied to the carrier output from the 50 kilocycle synchronizing modulator exciter 97 and consequently from the master station synchronizing transmitter 41 and its antenna 44. At the end of the 10 seconds the cam arm 95 de-energizes the code keying switch in the keying and phasing equipment 43 and moves to its second position where it remains for one second, as indicated.

The start of the coarse system operation begins at the end of the first identification code position 10 seconds mentioned above. When the cam arm 95 is at its second position, acting through suitable usual equipment, not shown, such as a microswitch, a relay or the like, connecting the ganged cam arms 95 and 96 with the keyer switches, it closes downwardly the keyer switches 85 and 100 to their respective contacts connected with the start oscillator 81 and with the frequency multiplier and limiter 103. The 182 kilocycle unmodulated "start" signal then broadcast from the master station operational transmitter 40 and its antenna 42, may illustratively be keyed to represent a dash and a dot. The dot so transmitted denotes the "start" signal for beginning a determination of a coarse sector reading at the aircraft 72. During the first elapsed 11 second period, resulting from the addition of the ten seconds during which the ground station identification signal is being broadcast and the one second when the "start" dash and dot signal is transmitted, no modulation appears on the 50 kilocycle carrier radiated from the synchronizing transmitter antenna 44 of the master station transmitter 41.

At the end of the second during which the "start" signal is transmitted, and when the operational timing cam arm 95 engages its second contact, the keyer switches 85 and 100 are caused to be returned to their connections with the oscillator 80 and with the modulator exciter 102 respectively.

For the next 10 seconds during the transmission of the signals for the taking of the coarse sector system readings both cam arms 95 and 96 are on their third contacts. With the cam arm 95 on its third contact the operational signal 200 cycle modulation from the divider 89 is impressed upon the 180 kilocycle carrier transmitted from the antenna 42 of the master station operational transmitter 40. At the same time the same cam arm 95 on its third contact causes suitable usual means, such as a spring loaded and clutch actuated rotary phase shifter such as a capacitive goniometer for example, not shown, in the keying and phasing equipment 43, to revolve at an illustrative rate of one revolution every 8 seconds for a total period of 10 seconds. This phase shift provides, between the master and slave stations of one pair of stations and appearing at the output meter 75 in the aircraft 72 when progressively positioned at the different sectors, a succession of null signals corresponding to the number of and separately timed 1 second apart to be distinctive of the coarse sectors represented in Fig. 2 of the drawings.

During this same 10 second period, the synchronous timing cam arm 96 is at its third position where as causes the 50 cycle fixed phase synchronizing modulation from the divider 90 to be impressed upon the 50 kilocycle carrier transmitted as a synchronizing signal from the antenna 44 of the master station synchronizing transmitter 41. As previously described, synchronizing signal from the master station synchronizing transmitter 41 maintains an exact phase relation between the continuously shifting phase of the operational signal from the master transmitter 40 and the operational fixed phase signal from the slave transmitter 52. In this manner the phase relation between the operational signals intercepted by the aircraft receiver 71 is distinctive of the location of the aircraft 72 with respect to the master and slave stations concerned. The phase relation distinctive of a particular hyperbolic line of the system between a pair of master and slave stations stems from the definition of a hyperbola as the locus of a point moving so that the differences between its distances from the hyperbolic foci is constant. For each hyperbolic line in a system a particular operational signal phase relation is characteristic.

The keying and phasing equipment 43 in the master station M1 keys on and off the operational signals under its control. The rate of keying preferably is once per second for accuracy of observation in the aircraft 72. In this manner the observer in the aircraft 72 hears in his headphones the keyed signals at the rate of one per second until the phase difference between the operational signals 150 and 151 in Fig. 7 just cancel each other and the keyed signal the observer should have heard, is replaced by a null distinctive of the location of the observer. Thus after the start signal the number of keyed signals arriving at one second intervals and received at the time of the arrival of the null signal identifies the particular hyperbolic line nearest which the pilot is located in both the coarse and in the fine systems.

At the start of the taking of a fine lane or fine system determination, both cam arms 95 and 96 are at their fourth fine system "start" positions for a period of one second. The operational cam arm 95 on its fourth position, as before when broadcasting a "start" signal, causes switch arms 85 and 100 to engage their contacts with the "start" oscillator 81 and the frequency multiplier and limiter 103, respectively, during the transmission of the 182 kilocycle unmodulated signal keyed to represent the "start" signal dash and dot. The dot in this case denotes the "start" signal of the fine system determination. With the synchronizing cam arm 96 on its fourth position, no modulation appears on the 50 kilocycle carrier radiated from the transmitter antenna 44. At the end of this second the keyer switches 85 and 100 are returned to their contacts with the oscillator 80 and with the modulator exciter 102, respectively.

In the transmission of signal from which fine system determinations may be made both cam arms 95 and 96 remain on their fifth contacts for 64 seconds. The operational contact arm 95 on its fifth cam contact, impresses two kilocycle operational modulation signal from the multivibrator multiplier 92 upon the 180 kilocycle carrier transmitted from the antenna 42 of the master station operational transmitter 40. This operational modulation signal assists the aircraft 72 in identifying the fine line of position nearest which it is located within the previously identified coarse sector. During the time the operational contact arm 95 is on its fifth contact the rotary phase shifter in the keying and phasing equipment 43 illustratively is caused to revolve one revolution in 60 seconds for a total period of 64 seconds. This phase shift provides, as in the coarse system, a series of fine system signal nulls to be counted by the pilot in the aircraft 72 in identifying a particular fine lane of position for the aircraft 72 within the previously identified coarse sector. As in the transmission of signal for use in making coarse sector determinations, the phase shifter will rotate more than 360 degrees, since this step is 64 seconds in duration.

The synchronous cam arm 96 in engagement with its fifth contact during this period of 64 seconds, impresses 100 cycle modulation upon the 50 kilocycle carrier transmitted from the antenna 44 as a synchronizing signal. At the end of 86 seconds the cycle is ready to repeat itself. Preferably the cycles repeat themselves at intervals of 2 minutes with the period of emission of the coarse system modulation alternated with the period of emission of the fine system modulation.

The process of modulation is substantially the same in the two systems of modulation, with the frequency of the fine modulation increased over that of the coarse modulation by a suitable ratio of for example 8 to 1. The period of the fine system phase shift cycle also preferably is increased over the period of the coarse system phase shift cycle by a suitable amount of for example about 1 minute.

In both the coarse sector and in the fine lane determinations of the position of the aircraft 72, null signals are counted after the "start" signal, as previously stated. These operational null signals are derived from modulation envelopes 150 and 151 in Fig. 7 impressed as operational signals upon the 180 kilocycle carriers from the master station transmitter 40 and from the slave station transmitter 52, respectively. These two modulation envelopes are identical and are displaced in phase relative to each other at any instant by a time difference or by a time delay $\Delta t$. The value $\Delta t$ in Fig. 7 is the variable delay in microseconds at any instant of the fixed phase slave ground wave or modulation envelope 151 with respect to the continuously phase shifted master ground wave or modulation envelope 150. Both of the master and slave modulation envelopes 150 and 151 are identical and have equal frequency differences $\Delta f$.

The master and the slave modulation envelopes 150 and 151, respectively, are intercepted at the aircraft 72 and provide a mixer output in the aircraft receiver represented by a difference or IF frequency of a wave length T that is inversely proportional to the modulation frequency FM.

The pilot in the aircraft listens to the station identifying signal then waits for the "start" signal of a coarse system determination. At the coarse system "start" signal he starts his stop watch and at the first null stops his stop watch. The number of elapsed seconds, applied to charts supplied to him, identifies a particular coarse sector in which he is positioned.

The pilot then waits for the "start" signal of the fine system determination when he again starts his stop watch and then stops it at the next succeeding null signal. The elapsed period in seconds read from his stop watch applied to his charts provides the pilot with the fine lane within the previously determined coarse sector nearest which the aircraft is positioned.

It is to be understood that the particular embodiment of the present invention that is illustrated and described herein has been submitted for the purposes of presenting an operative equipment for use in the practice of the present invention and that modifications may be made therein without departing from the scope of the present invention.

What we claim is:

1. A long-range navigation system for determining the geographical location of a mobile station with respect to a hyperbolic line of position on a Loran grid comprising, a pair of fixed radio transmitting stations spaced apart at known locations on a base line associated with said grid and each adapted to transmit a radio frequency carrier continuous wave of the same frequency, means at each transmitting station for frequency modulating the carriers at an equal fixed audio modulation frequency, means for cyclically and continuously varying the phase difference between the two carrier modulations through three hundred sixty degrees, means for transmitting a zero time marker signal when said phase difference is zero, an amplitude modulated wave receiver at said mobile station for receiving the frequency modulated waves from a fixed transmitting station whereby a signal of the modulating frequency is produced in the output of the receiver which cyclically varies in amplitude between maximum and minimum values at the frequency of said cyclic phase difference variation and which has a minimum value or null when the phase difference between the modulation of the frequency modulated wave is zero and means for indicating the occurrence of said null, the time elapsing between the reception of said marker signal and the occurrence of said null being a measure of the difference in distances between the mobile and the fixed stations and locating the mobile station on a known hyperbolic line of position on the Loran grid.

2. In a long range navigation system for determining the geographical location of a mobile station with respect to a hyperbolic line of position on a Loran grid and employing a pair of fixed radio transmitting stations spaced apart at known locations on a base line associated with said grid and wherein the shift in phase or time delay in the arrival of continuous wave signals at the mobile station simultaneously transmitted from the transmitting stations is indicative of the line of position of the mobile station, the improvement which comprises an amplitude modulated radio receiver at the mobile station means for generating and transmitting a radio frequency carrier at each transmitting station of substantially the same frequency, means for frequency modulating each carrier at an equal fixed modulating frequency, means for cyclically and continuously varying the phase difference between the two carrier modulations through three hundred and sixty degrees at a rate of the order of six degrees a second, means for impressing on one of the carriers a time marker signal indicative of the time when said phase difference is zero, means for receiving and detecting the transmitted energy at the receiving station, means for filtering the output of the receiver to pass signals only at substantially the modulation frequency and determining the time elapsing from reception of the time marker signal to an audio null as determinative of the difference in the transmission time from the fixed radio stations to the mobile station.

3. In a long range navigation system for determining the geographical location of a mobile station with respect to a hyperbolic line of position on a Loran grid, a pair of radio transmitting stations spaced apart at known locations on a base line associated with said grid and adapted to transmit radio frequency carrier continuous waves to the mobile station, means for effectively producing a carrier frequency difference of an order of from ten to fifteen cycles per second, means at each transmitting station for frequency modulating the carriers at an equal fixed audio modulation frequency, means for cyclically and continuously varying the phase difference between the two carrier modulations through three hundred sixty degrees, means for transmitting a zero time marker signal when said phase difference is zero, an amplitude modulated wave receiver at said mobile station for receiving the frequency modulated waves from a fixed transmitting station whereby a signal of the modulating frequency is produced in the output of the receiver which cyclically varies in amplitude between maximum and minimum values at the frequency of said cyclic phase difference variation and which has a minimum value or null when the phase difference between the modulation of the frequency modulated wave is zero, and means for indicating the occurrence of said null, the time elapsing between the reception of said marker signal and the occurrence of said null being a measure of the difference in distances between the mobile and the fixed stations and locating the mobile station on a known hyperbolic line of position on the Loran grid.

References Cited in the file of this patent

UNITED STATES PATENTS

| | | |
|---|---|---|
| 1,919,556 | Jacquemin | July 25, 1933 |
| 1,942,262 | Shanklin | Jan. 2, 1934 |
| 2,141,281 | Southworth | Dec. 27, 1938 |
| 2,141,282 | Southworth et al. | Dec. 27, 1938 |
| 2,413,620 | Guanella | Dec. 31, 1946 |
| 2,413,694 | Dingley | Jan. 7, 1947 |
| 2,541,627 | Williams | Feb. 13, 1951 |

FOREIGN PATENTS

| | | |
|---|---|---|
| 964,574 | France | Feb. 1, 1950 |